No. 844,266. PATENTED FEB. 12, 1907.
J. F. DOTSON.
KITCHEN IMPLEMENT.
APPLICATION FILED APR. 14, 1906.
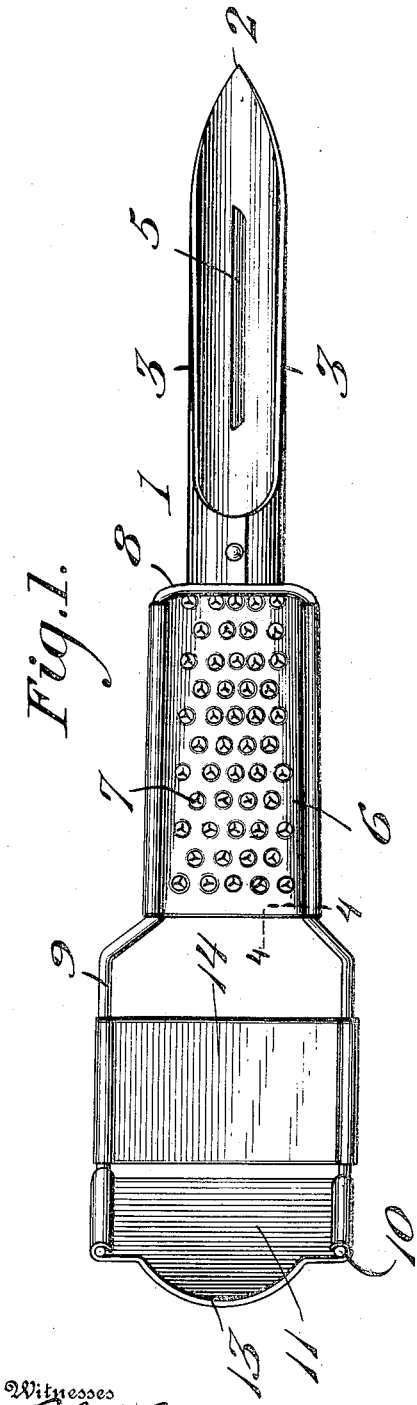
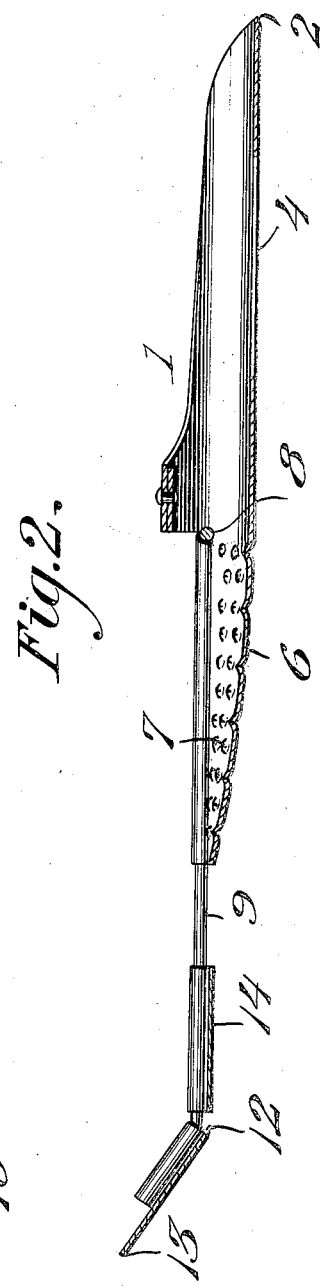
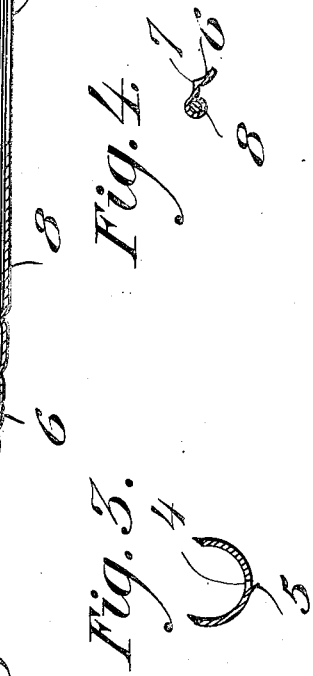
Inventor
J. F. Dotson.
Witnesses
By Victor J. Evans.
Attorney

UNITED STATES PATENT OFFICE.

JOHN F. DOTSON, OF TROY, NEW YORK.

KITCHEN IMPLEMENT.

No. 844,266.  Specification of Letters Patent.  Patented Feb. 12, 1907.

Application filed April 14, 1906. Serial No. 311,759.

*To all whom it may concern:*

Be it known that I, JOHN F. DOTSON, a citizen of the United States, residing at Troy, in the county of Rensselaer and State of New York, have invented certain new and useful Improvements in Kitchen Implements, of which the following is a specification.

This invention relates to kitchen implements of the type employed for paring and slicing fruit and vegetables, and has for its objects to produce a comparatively simple inexpensive device of this character whereby the paring and slicing operations may be quickly and properly performed, one wherein a ready adjustment may be effected for varying the thickness of the slices, and one in which the blade may be conveniently utilized for coring apples or removing the eyes of potatoes.

With these and other objects in view the invention comprises the novel features of construction and combination of parts more fully hereinafter described.

In the accompanying drawings, Figure 1 is a plan view of an implement embodying the invention. Fig. 2 is a longitudinal section taken centrally therethrough. Fig. 3 is a detail cross-section taken on the line 3 3 of Fig. 1. Fig. 4 is a detail sectional view taken on the line 4 4 of Fig. 1.

Referring to the drawings, 1 designates the blade, composed of sheet metal and bent into substantially semitubular form and having its forward end pointed or sharpened, as at 2, there being formed in the blade, the longitudinal edges 3 of which are sharpened, a central longitudinal opening 4, in the formation of which the material of the blade is struck outward and sharpened to present a cutting portion 5.

Formed integral with the blade 1 is a rearwardly-projecting portion or extension 6, curved to present an upper concaved face and provided with upstruck portions or teeth 7, forming a grating-surface which merges into the inner surface of the knife-blade, the longitudinal side edges of the extension 6 being folded around the spaced side portions of a substantially U-shaped wire frame 8, constituting a handle for the implement, and having in rear of the extension 6 spaced parallel arms 9, provided with upwardly-inclined terminal portions 10, adapted to sustain an inclined slicing-blade 11, the edges of which are folded around the portions 10 and which is provided with a forward sharpened cutting edge 12 and with a curved rearwardly-extending portion 13 for a purpose which will presently appear.

Slidably mounted on the arms in advance of the blade 11 is a gage member or plate 14, having its side edges folded around the side arms in frictional engagement therewith, said plate being adjustable toward and from the blade 11 for varying the thickness of the slices to be cut by the latter.

In practice the cutting portion 5 of blade 1 may be utilized for paring fruit or vegetables, while the pointed end 2 is adapted for removing specks or eyes from the same and the blade 1 for removing the cores of apples and the like. The sharpened edges 3 of the blade are to be employed for scraping vegetables and in the operation of scaling fish, while the extension 6 is employed for grating various materials, the blade 11 being intended for slicing materials, as before explained, and for cutting corn from the cob, after which the portion 13 is utilized for scraping the cob to obtain the milk or juice therefrom.

It will be observed that the implement, which is of simplified construction, may be utilized for the purposes recited, and that the various parts of the device may be readily and conveniently brought into play.

The U-shaped frame has in addition to the upward bend of its arm at the outer end two other bends, as shown, intermediate of the U end and the bent outer end, and the grater portion is fitted in the straight parts of the arm between the U end and the first of these bends in such manner that it cannot slip, while these bends also give the greatly increased width needed for the slicing and scraping blade 11 and the gage 14.

Having thus described my invention, what I claim is—

1. A kitchen implement comprising a U-shaped frame with the end portions of its arms bent slightly upward, a piece of sheet metal having one part formed into a semitubular paring and coring blade, and the other part formed with a grating-surface, and secured by its opposite edges to the U-end portion of the frame, a gage-plate secured between the arms of the frame, and a blade secured between the inclined end portions of the frame-arms, and provided with an inner cutting edge and an outer convex scraping edge.

2. A kitchen implement comprising a U- shaped frame with the end portions of its arms bent slightly upward, a piece of sheet metal having one part formed into a semitubular paring and coring blade, and the other part formed with a concave grating-surface which merges into the inner surface of the tubular knife and secured by its opposite edges to the U-end portion of the frame, a gage-plate secured between the arms of the frame, and a blade secured between the inclined end portions of the frame-arms and provided with an inner cutting edge and an outer convex scraping edge, substantially as specified.

3. A kitchen implement comprising a U-shaped frame, the end portions of its arms bent slightly upward, and also bent near their middle to increase the width of the frame, a piece of sheet metal having one part formed into a semitubular paring and coring blade, and the other part formed with a concave scraping-surface and secured by its opposite edges to the U-end portion of the frame, and fitting between said ends and the first bends, a gage-plate secured between the arms of the frame, and a blade secured between the inclined end portions of the frame-arms, and provided with an inner cutting edge and an outer convex scraping edge, substantially as specified.

In testimony whereof I affix my signature in presence of two witnesses.

JOHN F. DOTSON.

Witnesses:
CHARLES MARSHALL,
ELIAS KEHN.